United States Patent
Haddad

(10) Patent No.: US 8,434,142 B2
(45) Date of Patent: Apr. 30, 2013

(54) METHOD FOR MITIGATING ON-PATH ATTACKS IN MOBILE IP NETWORK

(75) Inventor: Wassim Haddad, San Jose, CA (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 429 days.

(21) Appl. No.: 12/793,610

(22) Filed: Jun. 3, 2010

(65) Prior Publication Data

US 2011/0214175 A1 Sep. 1, 2011

Related U.S. Application Data

(60) Provisional application No. 61/308,484, filed on Feb. 26, 2010.

(51) Int. Cl.
*H04L 29/00* (2006.01)
(52) U.S. Cl.
USPC .................. 726/14; 726/2; 726/3; 726/11
(58) Field of Classification Search ............. None
See application file for complete search history.

(56) References Cited

PUBLICATIONS

Johnson, D. et al., "Mobility Support in IPv6 draft-ietf-mext-rfc3775bis-05.txt," IETF Mobile IP Working Group, Oct. 19, 2009, 175 pages.
Johnson, D. et al., "Mobility Support in IPv6," Network Working Group, Jun. 2004, 165 pages.

*Primary Examiner* — Jeffrey Pwu
*Assistant Examiner* — Helai Salehi
(74) *Attorney, Agent, or Firm* — Blakely Sokoloff Taylor & Zafman, LLP

(57) ABSTRACT

In one aspect of the invention, a mobile node (MN) participates in a first return routability procedure with a home agent (HA) and a correspondent node (CN), including generating a first binding management key (Kbm). A first proof of knowledge (PoK) is generated by hashing the first Kbm. The MN participates in a second return routability procedure, including generating a second Kbm. A first binding update and binding acknowledgement (BU/BA) key is generated by hashing the second Kbm and the first PoK. A first binding update (BU) message is transmitted to the CN, where the second BU message is transmitted with the first BU/BA key. In response to a first binding acknowledgement (BA) message received from the CN, the MN authenticates the first BA message using the first BU/BA key.

22 Claims, 8 Drawing Sheets

METHOD FOR MITIGATING ON-PATH ATTACKS IN MOBILE IP NETWORK

RELATED APPLICATIONS

This application claims the benefit of U.S. Provisional Patent Application No. 61/308,484, entitled "Mitigating On-Path Attacks in Mobile IPv6," filed Feb. 26, 2010, which is incorporated by reference herein in its entirety.

FIELD OF THE INVENTION

Embodiments of the invention relate generally to the field of mobile Internet protocol (MIP) networks; and more particularly, to a method for mitigating on-path attacks in a MIP network.

BACKGROUND

Mobile IPv6 specification, as described in §5.2 of RFC-3775, explicitly mentions that its defense mechanism does not cover attacks which are launched by a malicious node located on path between a home agent (HA) of a mobile node (MN) and a particular correspondent node (CN). A malicious node refers to an attacker located somewhere on-path between the targeted MN's HA and the CN. This means that the attacker is able to spoof the content of a full home test init/home test (HoTI/HoT) messages exchange between the MN and the CN.

A malicious node can launch a session hijacking attack by spoofing the parameters carried in the HoT message sent by the CN to the MN, followed by exchanging care-of test init/care-of test (CoTI/CoT) messages using as a care-of address (CoA) an address configured on another interface. After a successful return routability (RR) exchange, a binding update (BU) message can be sent by the attacker to the CN signaling that the MN has moved to another location. Consequently, the CN may re-direct its data packets to the new MN's CoA. Such an attack will severely disrupt the traffic flow exchanged between the MN and the CN especially for time sensitive applications.

FIG. 1 is a diagram illustrating a typical return routability procedure of a MIP network. Referring to FIG. 1, when MN 101 moves to a foreign network, it obtains a CoA. A binding cache entry is created in MN's HA 102 and CN 103 that maps the MN's home address (HoA) to its CoA. Typically, a return routability procedure is performed. The return routability procedure establishes proof to the CN that the MN is reachable at both its home address (using the indirect path) and its care of address (using the direct path) and determines tokens that are used to derive a binding management key (Kbm), which is used to calculate authorization data values for binding messages such as binding update (BU) and binding acknowledgement (BA) messages.

In this example, during a return routability procedure, MN 101 sends a HoTI message to HA 102 which forwards the HoTI message to CN 103. In parallel, MN 101 sends a CoTI message to CN 103. In return, CN 103 sends a HoT message with a HoA token back to MN 101 via HA 102 and sends a CoT message with a CoA token to MN 101 directly. The MN 101 can derive a Kbm based on the HoA token and CoA token. The Kbm can be used for subsequent binding maintenance (e.g., BU/BA message exchanges) as long as the MN's HoA and CoA do not change. The BU and BA message exchange uses the Kbm to prove that the messages were sent from the nodes that participated in the return routability procedure. For the binding update, the CN verifies the included authorization data, updates its binding cache with an entry for the MN, and typically returns a BA message, which also contains authorization data calculated using the Kbm.

If attacker 104 on the path between HA 102 and CN 103 spoofs the traffic, such as HoT/HoTI messages, between HA 102 and CN 103, attacker 104 can obtain certain parameters such as HoA token (t2). Attacker 104 can use such information to impersonate MN 101 and hijack the session between MN 101 and CN 103. For example, once attacker 104 obtains the HoA token, attacker 104 can launch another CoTI/CoT exchange with CN 103 to obtain another CoA token (t3), using another CoA that is associated with attacker 104. Attacker 104 can then use the HoA token (t2) obtained from the spoofed HoT/HoTI exchange and the CoA token (t3) to form a Kbm2. The Kbm2 can then be used in subsequent BU/BA message exchange. Attacker 104 can then signal CN 103, by sending a fake, yet valid, BU message, indicating that the impersonated MN has moved to another location. Consequently, the CN may re-direct its data packets to the new MN's CoA. Such an attack may severely disrupt the traffic flow exchanged between the MN and the CN especially for time sensitive applications. There has been a lack of efficient ways to mitigate such an attack.

SUMMARY OF THE DESCRIPTION

A method to prevent an attacker on a path between a home agent (HA) associated with the MN and a correspondent node (CN) to hijack a session between the MN and the CN is described herein. In one aspect of the invention, a MN transmits and receives first messages to and from the HA and the CN as part of participating in a first return routability procedure, including generating a first binding management key (Kbm). A first proof of knowledge (PoK) is generated by hashing the first Kbm. The MN transmits and receives second messages to and from the HA and the CN as part of participating in a second return routability procedure, including generating a second Kbm. A first binding update and binding acknowledgement (BU/BA) key is generated by hashing the second Kbm and the first PoK. A first binding update (BU) message is transmitted to the CN, where the first BU message is authenticated by the CN using the first BU/BA key that is independently derived by the CN. In response to a first binding acknowledgement (BA) message received from the CN, the MN authenticates the first BA message using the first BU/BA key. As a result, the attacker is prevented from hijacking the session without possessing the first PoK.

According to another aspect of the invention, a CN transmits and receives first messages to and from a HA and a MN as part of participating in a first return routability procedure, including generating a first binding management key (Kbm). A first proof of knowledge (PoK) is generated by hashing the first Kbm. The CN transmits and receives second messages to and from the HA and the MN as part of participating in a second return routability procedure, including generating a second Kbm. A first binding update and binding acknowledgement (BU/BA) key is generated by hashing the second Kbm and the first PoK. In response to a first binding update (BU) message from the MN, the CN authenticates the first BU message using the first BU/BA key. Upon having successfully authenticated the first BU message, the CN transmits a first binding acknowledgement (BA) message to the MN, where the first BA message is authenticated by the MN using the first BU/BA key that is independently derived by the MN.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
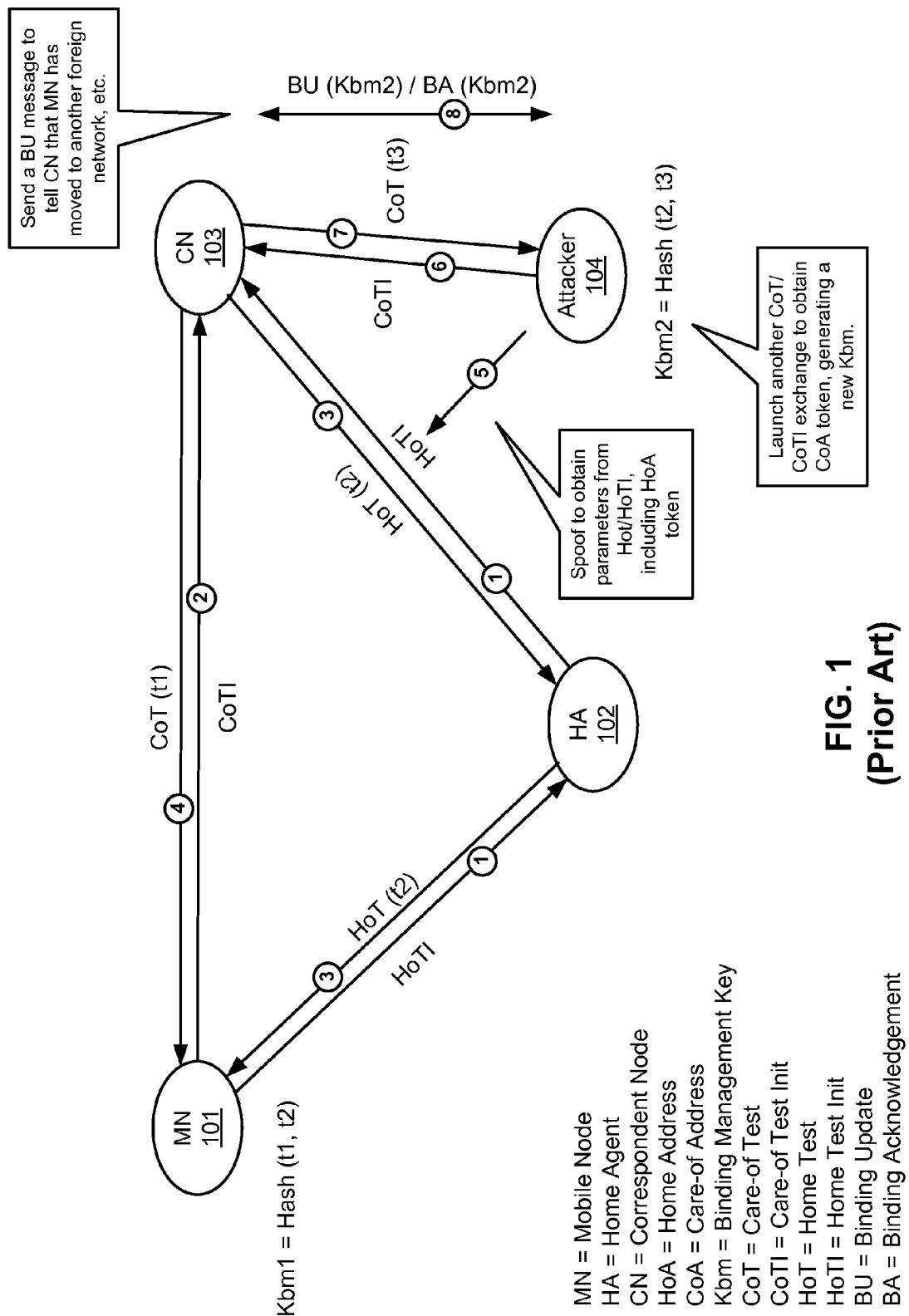
FIG. 1 is a diagram illustrating a typical return routability procedure of a mobile IP (MIP) network.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to some embodiments, a communications mechanism is utilized to narrow the window for launching the on-path attacks, for example, to one opportunity only, which would force a malicious node (e.g., attacker) to launch the attack at the earliest stage, i.e., before a CN receives the first overall BU message sent by a MN. In other words, the goal is to block any attempt(s) to hijack an ongoing session made after the CN creates a binding cache entry (BCE) for the MN.

In one embodiment, a chaining mechanism is utilized between all MN's movements starting from its first overall valid request to create a BCE at the CN side until the session is closed. Such chaining mechanism allows the CN to verify that the last BU message received has been sent by the same node that sent the previous one. This is done by allowing the two endpoints (e.g., CN and MN) to derive a parameter (referred to herein as a proof-of-knowledge (PoK) from the first overall BU message sent from the MN to the CN. The PoK is then stored in the MN's corresponding binding cache entry (BCE) maintained by the CN, together with other parameters defined in MIP specification, such as, for example, those defined in RFC-3775, which is incorporated by reference herein in its entirety.

Similarly, according to one embodiment, the MN also stores a copy of the PoK in its memory (e.g., cache memory). The PoK may be disclosed to the CN in the subsequent BU message(s) sent by the MN and carrying a new CoA. Such a BU message will in turn, lead to refreshing the PoK with a new value generated from the return routability exchange that was used to protect the last BU/BA exchange. In one embodiment, the PoK may be refreshed when the BU message carries a new CoA. That is, the PoK remains the same when the MN sends a BU message to refresh an existing binding (e.g., the same CoA).

Thus, if an attacker tries to launch a hijacking attack in a similar way as described above, then the attacker's BU message will be rejected by the CN as it lacks a knowledge of a valid PoK. Note that the only successful hijacking attack would be the one launched before the MN sends its first overall BU message to the CN. This also means that the attack will fail if the MN manages to initiate a session with the CN while being located in a foreign network. Note that the chaining operations may continue as long as the session with the CN remains alive, including an eventual "return-to-home" scenario, which will be described in details further below.

In one embodiment, disclosing the PoK consists of deriving a new key to authenticate the binding update and acknowledgment (BU/BA) messages from both the PoK and Kbm instead of using the Kbm alone as described in RFC-3775. For this purpose, the new key is obtained from hashing at least a portion of the stored PoK (which represents at least a portion of a Kbm generated during a previous return routability procedure) with the newly generated Kbm. After a successful binding update procedure (i.e., a new CoA is being stored), a new PoK is computed from hashing at least a portion of the Kbm and is stored in the new BCE.

Figure 2A:
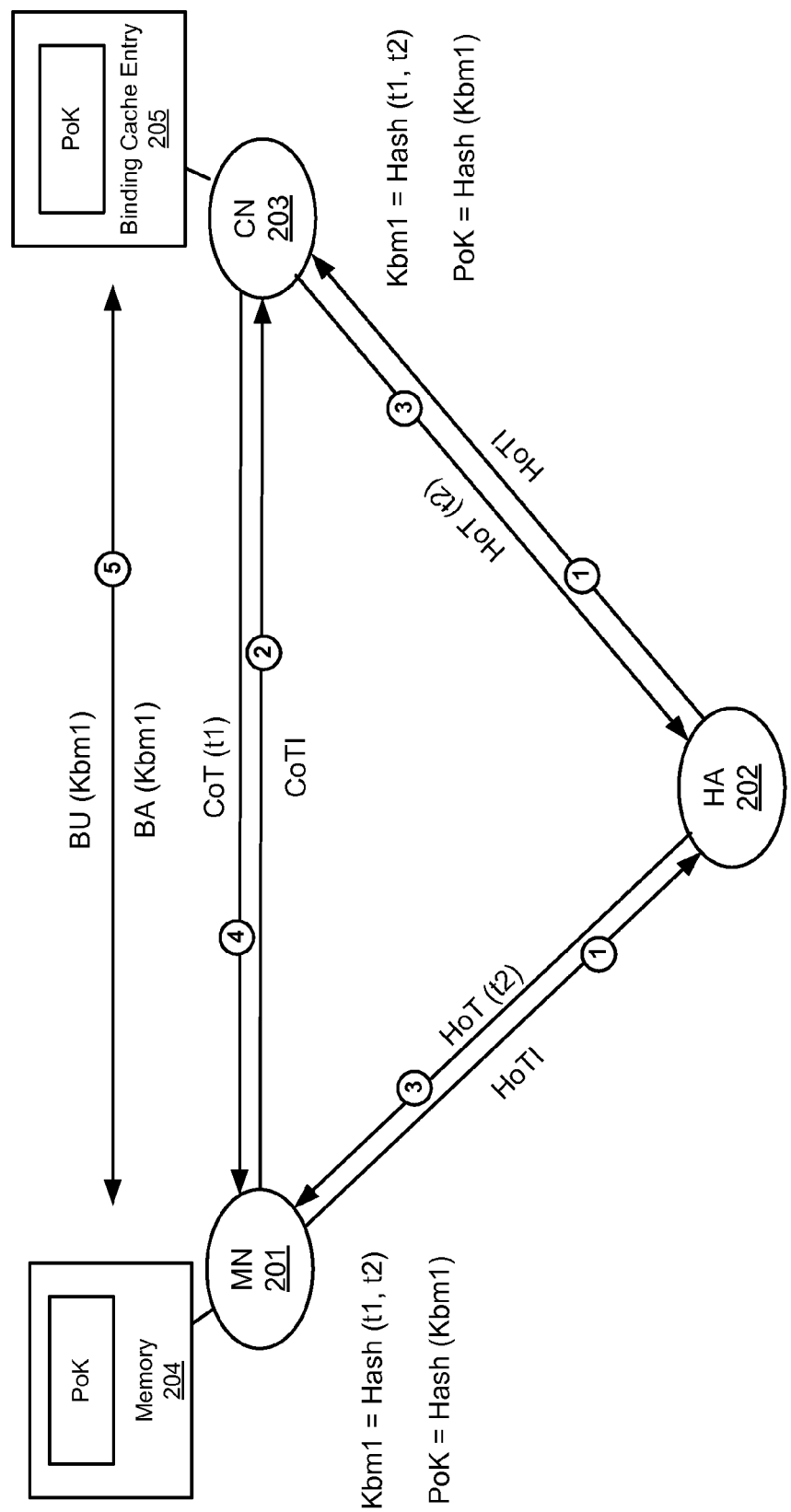
FIGS. 2A and 2B are diagrams illustrating a method for mitigating on-path attacks in a MIP network according to one embodiment of the invention.
Figure 2B:
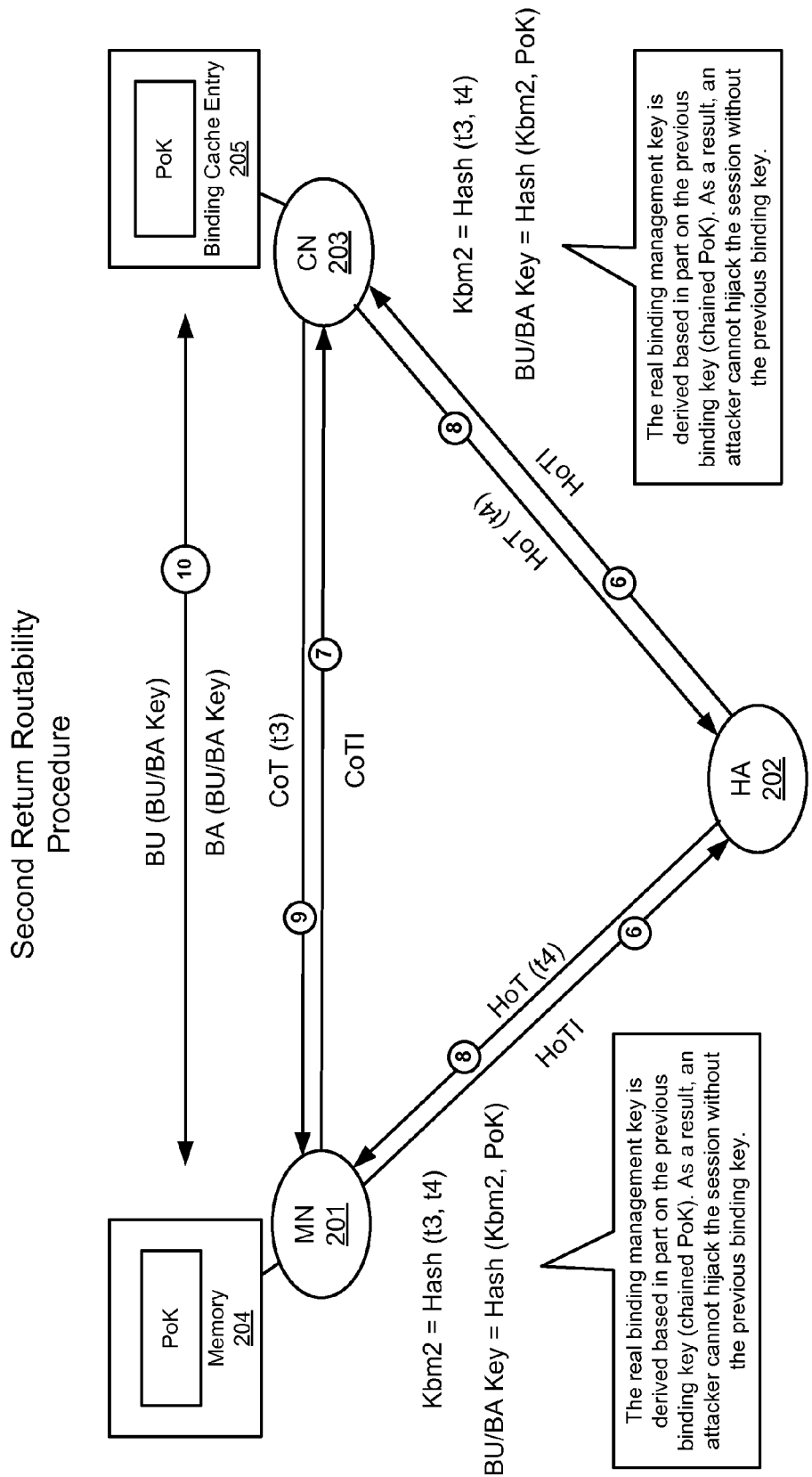

FIGS. 2A and 2B are diagrams illustrating a method for mitigating on-path attacks in a MIP network according to one embodiment of the invention. For the purpose of illustration, FIG. 2A illustrates a first initial return routability procedure while FIG. 2B illustrates a subsequent return routability procedure. Referring to FIG. 2A, when MN 201 moves to a foreign network and obtains a first CoA, a first return routability procedure is performed according to RFC-3775. During the first return routability procedure, MN 201 sends a HoTI message to HA 202 which forwards the HoTI message to CN 203 via path (1). MN 201 also sends a CoTI message directly to CN 203 via path (2). In response to the HoTI message, CN 203 sends a HoT message via path (3) back to MN 201 via HA 202, where the HoT message includes a HoA token (t2). In addition, in response to the CoTI message, CN 203 returns a CoT message back to MN 201 directly via path (4), where the CoT message includes a CoA token (t1).

Thereafter, both MN 201 and CN 203 independently derive a first Kbm: Kbm1, based on the HoA token and CoA token. For example, Kbm1 may be derived by hashing the HoA token and the CoA token (e.g., Kbm1=hash (t1, t2)) in a way similar to the one as described in RFC-3775. The hash operation may be performed using a variety of hash algorithms, such as, for example, SHA-1, SHA-2, or MD5. A cryptographic hash function is a deterministic procedure that takes an arbitrary block of data and returns a fixed-size bit string, the (cryptographic) hash value, such that an accidental or intentional change to the data will change the hash value. The data to be encoded is often called the "message", and the hash value is sometimes called the message digest or simply digest.

In addition, according to one embodiment, a proof of knowledge (PoK) is calculated by both MN 201 and CN 203 based on at least a portion of the Kbm1, for example, by hashing at least a portion of the Kbm1. The PoK is stored in memory or cache 204 of MN 201 and a BCE 205 associated with MN 201 in a binding cache of CN 203. The PoK can be used to generate subsequent keys for binding update and binding acknowledgement. In one embodiment, PoK can be derived as follows:

$$PoK = First[128, SHA2(Kbm1)]$$

Subsequently, referring now to FIG. 2B, when MN 201 moves to another location associated with a new CoA, a second return routability procedure is performed. During the second return routability procedure, similar to the first return routability procedure as shown in FIG. 2A, MN 201 sends a second HoTI message via path (6) to HA 202 which forwards the HoTI message to CN 203. MN 201 also sends a second CoTI message via path (7) to CN 203. In response to the second HoTI message, CN 203 returns, via path (8), a second HoT message having a second HoA token (t4) back to MN 201 via HA 202. In addition, in response to the second CoTI message, CN 203 returns, via path (9), a second CoT message having a second CoA token (t3) back to MN 201.

Based on the HoA token (t4) and CoA token (t3), both MN 201 and CN 203 can independently derive a second Kbm according to RFC-3775 as follows:

$$Kbm2 = hash(t3, t4)$$

In addition, according to one embodiment, a BU/BA key is calculated based on at least a portion of the Kbm2 (e.g., current Kbm, also referred to as a Kbm of a current return routability procedure) and at least a portion of a PoK stored in the cache or BCE (e.g., a proof of a previous Kbm, also referred to as a Kbm generated in a previous return routability procedure) as follows:

$$BU/BA\ Key = hash(Kbm2, PoK)$$

In one particular embodiment, the BU/BA key can be derived as follows:

$$BU/BA\ Key = First[128, SHA2(Kbm2|PoK)]$$

The BU/BA key can be used to authenticate subsequent BU/BA messages by CN 203 and MN 201, respectively. Note that the term of "BU/BA key" is used herein for the purpose of illustration only not to be confused with a Kbm that is generated via a regular return routability procedure as described in RFC-3775. In fact, a BU/BA key can be used in place of a new or current Kbm of a current return routability procedure:

$$New\ Kbm = hash(current\ HoA\ token | current\ CoA\ token | PoK\ of\ previous\ Kbm)$$

The new or current Kbm can be used to authenticate the subsequent BU/BA messages by CN 203 and MN 201, respectively.

The new Kbm or BU/BA key can be used to authenticate the BU/BA messages exchanged via path (10) between MN 201 and CN 203. Thus, a new Kbm is calculated based in part on a previous Kbm (e.g., in a chain). If an attacker cannot obtain a previous Kbm, the attacker's fake BU message would be rejected by the CN because the attacker cannot prove in the BU message that it possesses a valid PoK. Upon having successfully authenticated the BU/BA messages, a new PoK may be generated based on at least a portion of a current Kbm and stored in the cache of MN 201 and CN 203, which may be used to generate a new Kbm in a subsequent return routability procedure.

The above described "chaining" procedure may be enforced as long as the session between the two endpoints remains alive. However, the "chaining" may not be required as long as the BU message sent by the MN is carrying an existing CoA. In this case, the BU authentication is performed using a Kbm only.

As described above, the chaining process of Kbm can prevent an attacker from hijacking a session only based on an assumption that the attacker did not successfully spoof the initial HoTI/HoT exchange during an initial return routability procedure, for example, to obtain the initial HoA token. However, the attacker could wait for the MN to return to its home network and to move out again in which case, the attacker gets another chance to launch an on-path attack. This would consist of re-launching the attack when the MN engages again with the CN in another return routability procedure exchange upon moving to a new foreign network.

In order to block the attacker from hijacking the session after a "return-to-home" followed by a new departure from home, the "chaining" procedure may be extended to cover this scenario. Typically, when the MN returns to its home network, the MN will send a binding update to its HA and all CNs to delete the binding of the MN according to RFC-3775. According to one embodiment, the CN does not delete the MN's corresponding BCE when re-directing the data traffic to the MN's home network after the MN returns to its home network. Instead, in one embodiment, the corresponding BCE is updated with the MN's new location (i.e., home network) by simply replacing the CoA address with the MN's HoA and setting the binding lifetime to a predetermined period of time, such as, for example, 600 seconds. In such a scenario, the new (and last) value assigned to the PoK remains in the BCE together with a sequence number (SQN) value and the MN's home address. The sequence number may be the sequence number included in the last successfully authenticated binding update message.

In this case, the MN may exchange keep-alive messages with the CN periodically in order to renew the binding lifetime. When the CN stops receiving keep-alive messages from the MN for a predetermined period of time, which may be defined by the binding lifetime (e.g., binding lifetime expires), the CN may flush the binding cache entry corresponding to the MN in its binding cache.

In one embodiment, the periodic keep-alive messages include a BU message which carries a valid SQN and are authenticated with the current PoK stored in the BCE. The SQN value of a BU message should be incremented from or greater than the SQN of last successful BU message. Upon receiving a valid keep-alive message, the CN may send back a BA message under the same security measures.

In one embodiment, the BA message may carry an additional nonce which is used to refresh the PoK in the same way as described above. That is, the nonce is used as part of a Kbm to refresh the PoK before the binding lifetime expires. According to one embodiment, the new PoK may be refreshed by hashing at least a portion of the existing PoK with the nonce. After refreshing the PoK, the binding lifetime is reset again to the predetermined period of time (e.g., 600 seconds). In one embodiment, the CN also stores the nonce in the MN's corresponding BCE together with the PoK until the expiration of the binding after which, a new PoK is generated to replace the previous one. That is, the MN refreshes its corresponding BCE and receives a new nonce prior to the binding lifetime expiration (e.g., 600 seconds). Otherwise, the CN will not be able to validate the BU message authenticated with the previous PoK. In one embodiment, the nonce carried in the BA message may be sent encrypted with the PoK (e.g., the last valid PoK) used by the CN to authenticate the message.

As a result, even if an attacker successfully spoofed the HoT/HoTI messages during a return routability procedure after the MN returns home and leaves again. The attacker still cannot hijack the session because the attacker cannot obtain the valid PoK, which is periodically refreshed. The attacker cannot obtain the valid SQN either, where the SQN can be used by the CN to verify that the subsequent BU message is received from the same MN after the MN returns home and leaves home again. The SQN is usually needed in order to avoid replaying the BU message.

Figure 3:
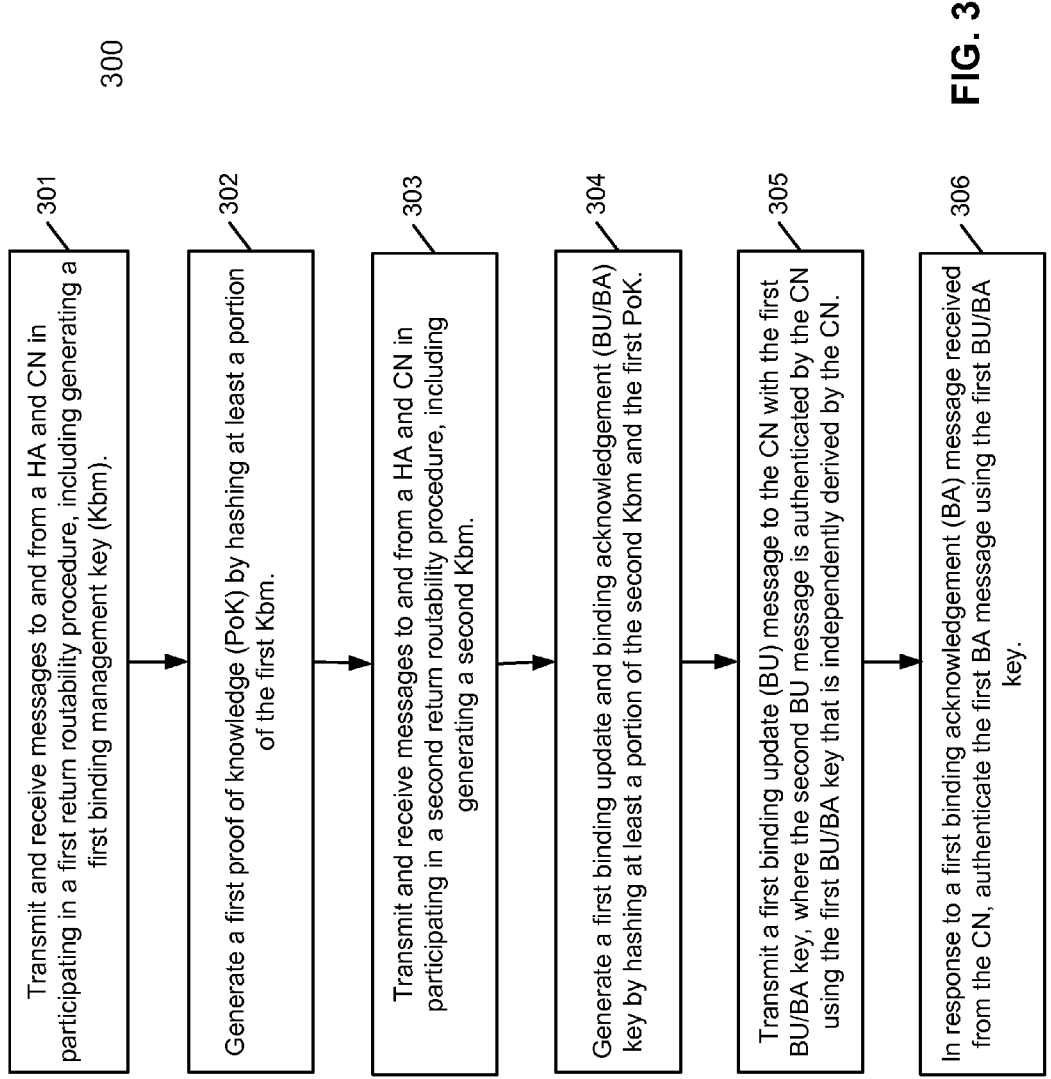
FIG. 3 is a flow diagram illustrating a method to mitigate on-path attacks in a MIP network according to one embodiment of the invention.

FIG. 3 is a flow diagram illustrating a method to mitigate on-path attacks in a MIP network according to one embodiment of the invention. For example, method 300 may be performed by MN 201 of FIGS. 2A-2B. Referring to FIG. 3, at block 301, a MN transmits and receives messages to and from a HA associated with the MN and a CN as part of participating in a first return routability procedure with the HA and CN, which generates a first Kbm. At block 302, a first PoK is generated by hashing at least a portion of the first Kbm. At block 303, the MN transmits and receives messages to and from the HA and the CN as part of participating in a second return routability procedure with the HA and CN, which generates a second Kbm. At block 304, a first BU/BA key is generated by hashing at least a portion of the second Kbm and the first PoK. At block 305, a first BU message is transmitted to the CN with at least a portion of the first BU/BA key, where the first BU message is authenticated by the CN using the first BU/BA key that is independently derived by the CN. In response to a first BA message received from the CN, at block 306, the MN authenticates the first BA message using the first BU/BA key.

Figure 4:
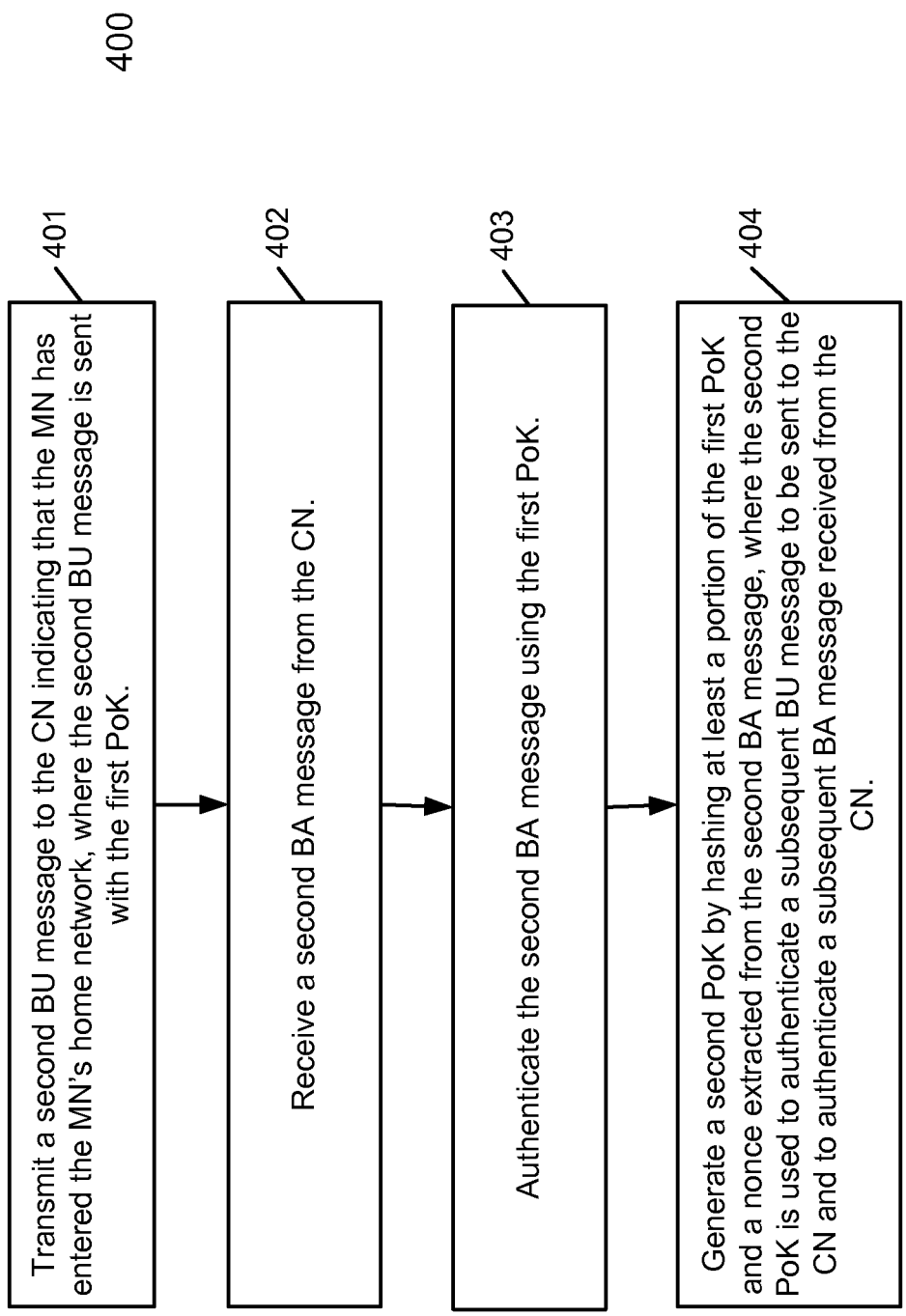
FIG. 4 is a flow diagram illustrating a method to mitigate on-path attacks in a MIP network according to another embodiment of the invention.

FIG. 4 is a flow diagram illustrating a method to mitigate on-path attacks in a MIP network according to another embodiment of the invention. For example, method 400 may be performed by MN 201 of FIGS. 2A-2B for refreshing a PoK after the MN returns home. Referring to FIG. 4, at block 401, after MN returns home, the MN sends a second BU message to the CN indicating that the MN has returned home. The second BU message may be authenticated by the CN using the first PoK (e.g., the latest PoK maintained within the MN's BCE by the CN) that is derived independently by the CN. At block 402, a second BA message is received from the CN in response to the second BU message. In one embodiment, the second BA message includes a nonce, which may be encrypted by the first PoK. At block 403, the MN authenticates the second BA message using the first PoK (e.g., the latest PoK maintained within a memory of the MN). At block 404, a second PoK is generated by hashing at least a portion of the first PoK and the nonce extracted from the second BA message. The second PoK is then stored in the memory, replacing the previous version of the PoK. As a result, the PoK is refreshed based on the nonce which is provided by periodically exchanging the BU/BA messages with the CN. The new PoK is used to authenticate the subsequent BU/BA messages by the CN and MN, respectively.

Figure 5:
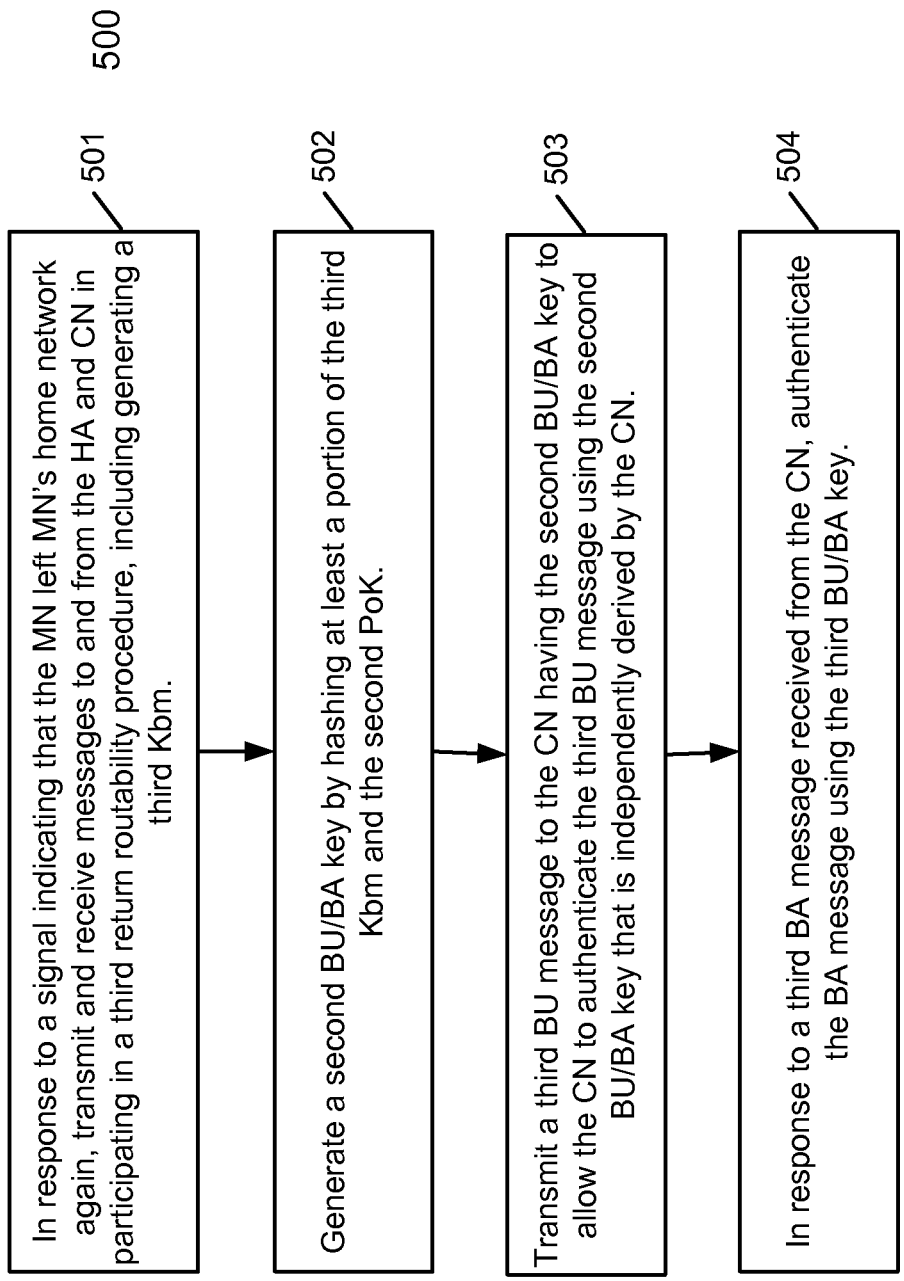
FIG. 5 is a flow diagram illustrating a method to mitigate on-path attacks in a MIP network according to another embodiment of the invention.

FIG. 5 is a flow diagram illustrating a method to mitigate on-path attacks in a MIP network according to another embodiment of the invention. Referring to FIG. 5, at block 501, in response to a signal indicating that the MN has left the MN's home network again after returning home, the MN transmits and receives messages as part of participating a third return routability procedure, which generates a third Kbm. At block 502, a second BU/BA key is generated by hashing at least a portion of the third Kbm and the second PoK. At block 503, a third BU message is transmitted to the CN with the second BU/BA key, where the third BU message is authenticated by the CN using the second BU/BA key that is independently derived by the CN. In addition, the third BU message may include a sequence number that is greater than the sequence number of the last BU message sent to the CN. At block 504, in response to a third BA message received from the CN, the MN authenticates the BA message using the third BU/BA key.

Figure 6:
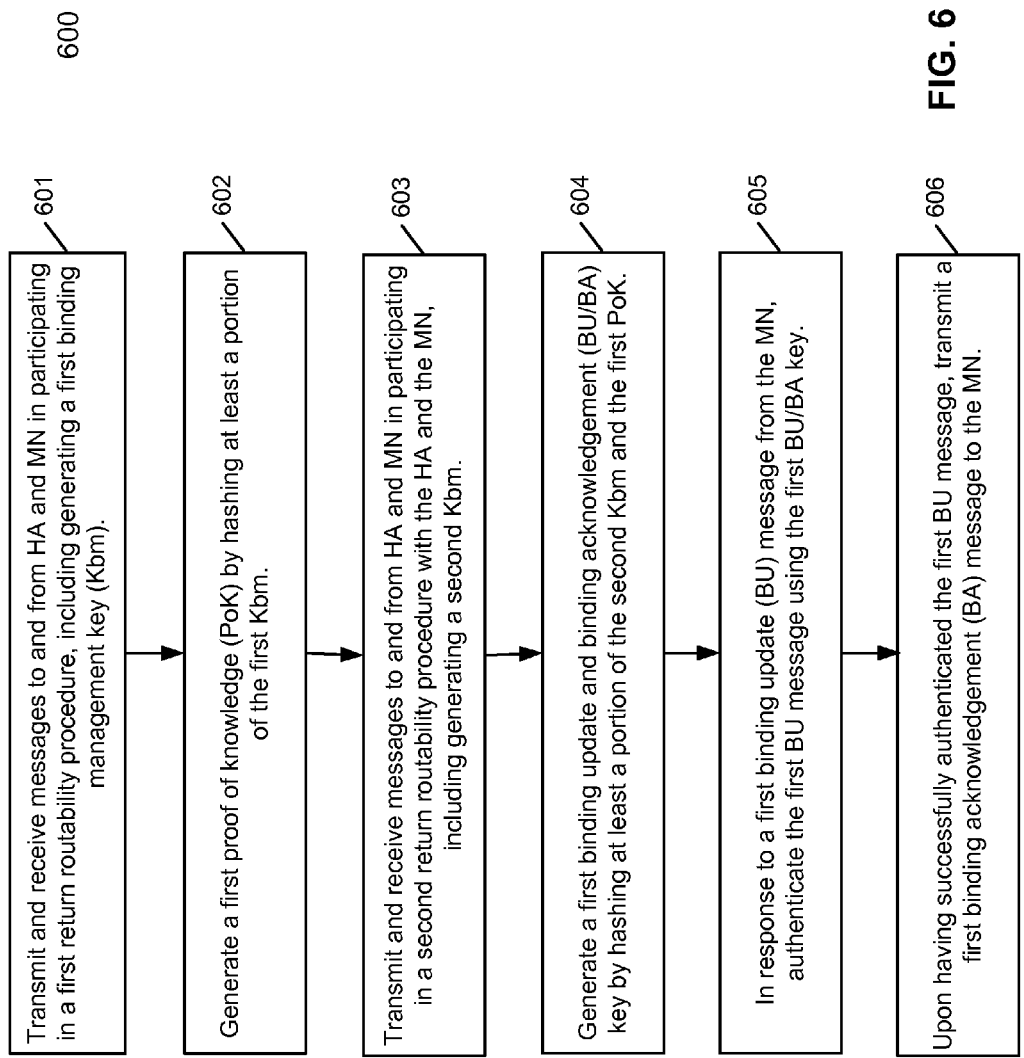
FIG. 6 is a flow diagram illustrating a method to mitigate on-path attacks in a MIP network according to another embodiment of the invention.

FIG. 6 is a flow diagram illustrating a method to mitigate on-path attacks in a MIP network according to another embodiment of the invention. For example, method 600 may be performed by a CN node such as CN 203 of FIGS. 2A-2B. Referring to FIG. 6, at block 601, a CN transmits and receives messages to and from a HA and a MN in participating a first return routability procedure, including generating a first Kbm. At block 602, a first PoK is generated by hashing at least a portion of the first Kbm. At block 603, the CN transmits and receives messages to and from the HA and MN as part of second return routability procedure, including generating a second Kbm. At block 604, a BU/BA key is generated by hashing at least a portion of the second Kbm and the first PoK. In response to a first BU message received from the MN, at block 605, the CN authenticates the first BU message using the BU/BA key. Upon having successfully authenticated the first BU message, at block 606, a BA message is transmitted to the MN with the BU/BA key.

Figure 7:
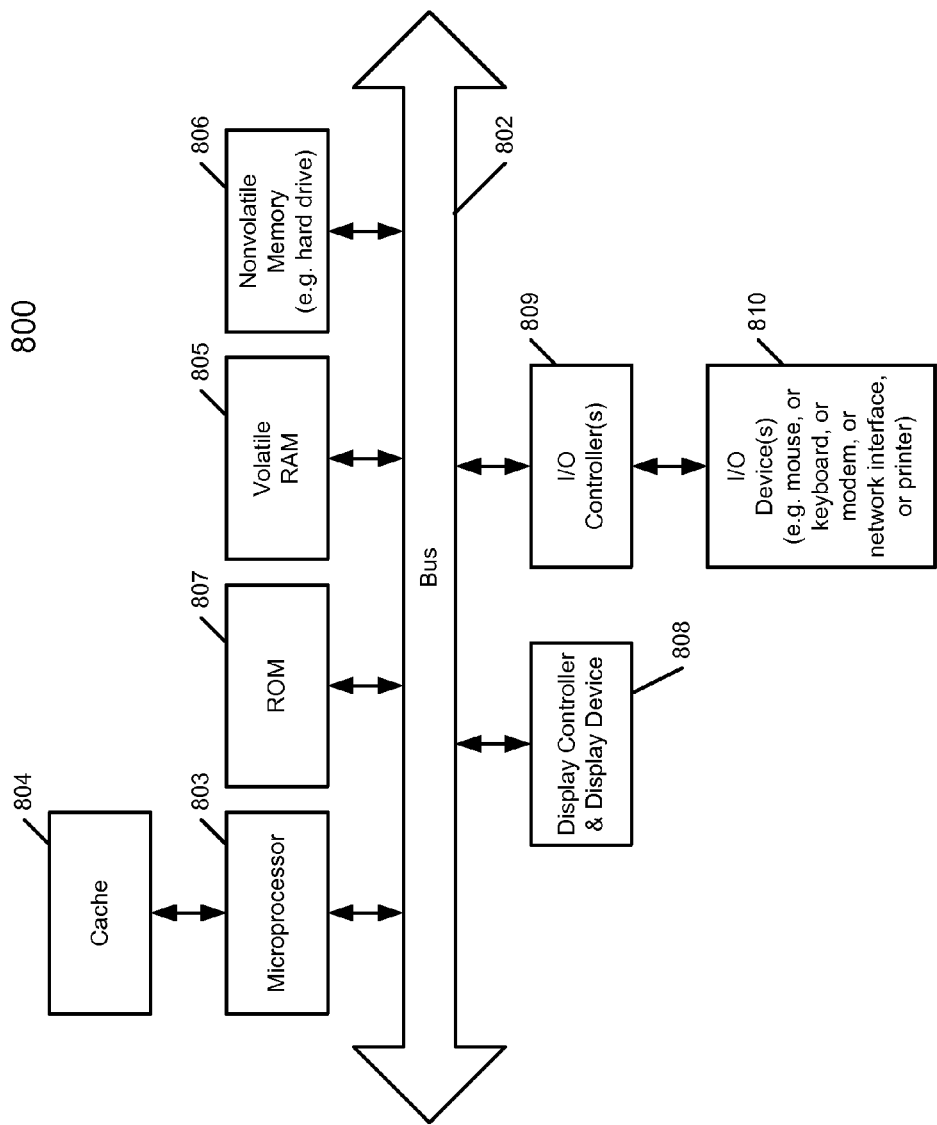
FIG. 7 is a block diagram of a data processing system, which may be used with one embodiment of the invention.

FIG. 7 is a block diagram of a data processing system, which may be used with one embodiment of the invention. For example, the system 800 shown in FIG. 7 may be implemented as part of a mobile node, a correspondent node, or a home agent as described above. Note that while FIG. 7 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 7 may, for example, be an Apple Macintosh computer or MacBook, or an IBM compatible PC.

As shown in FIG. 7, the computer system 800, which is a form of a data processing system, includes a bus or interconnect 802 which is coupled to one or more microprocessors 803 and a ROM 807, a volatile RAM 805, and a non-volatile memory 806. The microprocessor 803 is coupled to cache memory 804. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a mobile node (MN) of a mobile internet protocol (MIP) network to prevent an attacker on a path between a home agent (HA) associated with the MN and a correspondent node (CN) to hijack a session between the MN and the CN, wherein the MN includes a microprocessor, the method comprising the steps of:
    transmitting and receiving, by the MN, first messages to and from the HA and the CN as part of participating in a first return routability procedure, including generating a first binding management key (Kbm);
    generating a first proof of knowledge (PoK) by hashing the first Kbm;
    transmitting and receiving, by the MN, second messages to and from the HA and the CN as part of participating in a second return routability procedure, including generating a second Kbm;
    generating a first binding update and binding acknowledgement (BU/BA) key by hashing the second Kbm and the first PoK;
    transmitting, by the MN, a first binding update (BU) message to the CN with the first BU/BA key, wherein the first BU message is authenticated by the CN using the first BU/BA key that is independently derived by the CN; and
    in response to a first binding acknowledgement (BA) message received from the CN, authenticating the first BA message using the first BU/BA key, whereby the attacker is prevented from hijacking the session without possessing the first PoK.

2. The method of claim 1, wherein the second Kbm is generated by hashing a first token extracted from a home test (HoT) message received from the CN via HA during the second return routability procedure and a second token extracted from a care-of test (CoT) message received from the CN during the second return routability procedure.

3. The method of claim 1, further comprising the steps of:
    transmitting, by the MN, a second BU message to the CN indicating that the MN has entered the MN's home network, the second BU message including the first PoK;
    receiving, by the MN, a second BA message from the CN;
    authenticating the second BA message using the first PoK; and
    generating a second PoK by hashing the first PoK and a nonce extracted from the second BA message, wherein the second PoK is used to authenticate a subsequent BU message to be sent to the CN and to authenticate a subsequent BA message received from the CN.

4. The method of claim 3, wherein the nonce is encrypted with the first PoK by the CN.

5. The method of claim 3, wherein the second BU message is transmitted to the CN periodically while the MN is located within the MN's home network, wherein for each BA message received from the CN, a new PoK is generated based on a previous PoK and the nonce extracted from each BA message.

6. The method of claim 3, further comprising the steps of:
    in response to a signal indicating that the MN has left the MN's home network again, transmitting and receiving by the MN third messages as part of participating in a third return routability procedure with the HA and the CN, including generating a third Kbm;
    generating a second BU/BA key by hashing the third Kbm and the second PoK;
    transmitting, by the MN, a third BU message to the CN having the second BU/BA key to allow the CN to authenticate the third BU message using the second BU/BA key that is independently derived by the CN; and
    in response to a third BA message received from the CN, authenticating the BA message using the third BU/BA key.

7. The method of claim 6, wherein the third BU message is transmitted with a sequence number that is greater than the sequence number of the second BU message to allow the CN to verify that the third BU message is received from the MN within the same session.

8. A method performed by a correspondent node (CN) of a mobile internet protocol (MIP) network to prevent an attacker on a path between a home agent (HA) associated with the MN and a correspondent node (CN) to hijack a session between the MN and the CN, wherein the CN includes a microprocessor, the method comprising the steps of:
- transmitting and receiving, by the CN, first messages to and from the HA and the MN as part of participating in a first return routability procedure, including generating a first binding management key (Kbm);
- generating a first proof of knowledge (PoK) by hashing the first Kbm;
- transmitting and receiving, by the CN, second messages to and from the HA and the MN as part of participating in a second return routability procedure, including generating a second Kbm;
- generating a first binding update and binding acknowledgement (BU/BA) key by hashing the second Kbm and the first PoK;
- in response to a first binding update (BU) message from the MN, authenticating the first BU message using the first BU/BA key; and
- upon having successfully authenticated the first BU message, transmitting by the CN a first binding acknowledgement (BA) message to the MN, wherein the first BA message is authenticated by the MN using the first BU/BA key that is independently derived by the MN, whereby the attacker is prevented from hijacking the session without possessing the first PoK.

9. The method of claim 8, further comprising the steps of:
- upon having successfully authenticated the first BU message, creating a binding cache entry (BCE) associated with the MN in a binding cache within the CN; and
- storing the first PoK, the first BU/BA key, and a sequence number of the first BU message in the BCE associated with the MN.

10. The method of claim 9, further comprising the steps of:
- in response to a second BU message received from the MN indicating that the MN has entered the MN's home network, authenticating the second BU message using the first PoK;
- generating a second PoK by hashing the first PoK and a nonce generated by the CN;
- updating information stored in the BCE associated with the MN, including storing the second PoK and the second BU message's sequence number in the BCE;
- transmitting, by the CN, a second BA message to the MN, the second BA message including the nonce to allow the MN to derive the second PoK, wherein the second PoK is used to authenticate a subsequent BU message received from the MN and to encrypt a subsequent BA message to be sent to MN.

11. The method of claim 10, wherein the nonce is encrypted with the first PoK by the CN.

12. The method of claim 10, further comprising deleting the first BU/BA key from the BCE without deleting the BCE by retaining the second PoK and the sequence number therein, in response to the second BU message received from the MN indicating that the MN has entered the MN's home network.

13. The method of claim 10, wherein the second BU message is received from the MN periodically while the MN is located within the MN's home network, wherein for each BU message received from the MN, a new PoK is generated based on a previous PoK and a new nonce.

14. The method of claim 13, further comprising deleting the BCE from the binding cache if there is no BU message received from the MN within a predetermined period of time, while the MN is within the MN's home network.

15. The method of claim 10, further comprising the steps of:
- in response to a signal indicating that the MN has left the MN's home network again, transmitting and receiving by the CN third messages as part of participating in a third return routability procedure with the HA and the MN, including generating a third Kbm;
- receiving, by the CN, a third BU message from the MN having a second BU/BA key to allow the CN to authenticate the third BU message using the second BU/BA key that is independently derived by the CN; and
- transmitting, by the CN, a third BA message to the MN.

16. The method of claim 15, wherein the third BU message is received with a sequence number that is greater than the sequence number of the second BU message to allow the CN to verify that the third BU message is received from the MN within the same session.

17. A method performed by a mobile node (MN) of a mobile internet protocol (MIP) network to prevent an attacker on a path between a home agent (HA) associated with the MN and a correspondent node (CN) to hijack a session between the MN and the CN, wherein the MN includes a microprocessor, the method comprising the steps of:
- transmitting and receiving, by the MN, messages to and from the HA and CN as part of participating in a current return routability procedure, generating a current binding management key (Kbm);
- generating a current binding update and binding acknowledgement (BU/BA) key by hashing the current Kbm and a previous proof-of-knowledge (PoK), wherein the previous PoK was generated by hashing a previous Kbm generated during a previous return routability procedure with the HA and CN;
- transmitting, by the MN, a binding update (BU) message to the CN, the BU message including the BU/BA key; and
- in response to a binding acknowledgement (BA) message received from the CN, authenticating the BA message using the BU/BA key, whereby the attacker is prevented from hijacking the session without possessing the previous PoK.

18. The method of claim 17, further comprising generating a current PoK by hashing the current Kbm, wherein the current PoK is used to generate a subsequent BU/BA key in a subsequent return routability procedure with the HA and CN.

19. A data processing system, comprising:
- a processor; and
- a memory coupled to the processor for storing instructions, which when executed from the memory, cause the processor to
  - transmit and receive first messages to and from a home agent (HA) and a correspondent node (CN) as part of participating in a first return routability procedure, including generating a first binding management key (Kbm),
  - generate a first proof of knowledge (PoK) by hashing the first Kbm,
  - transmit and receive second messages to and from the HA and the CN as part of participating in a second return routability procedure, including generating a second Kbm, generate a first binding update and binding acknowledgement (BU/BA) key by hashing the second Kbm and the first PoK, transmit a first binding update (BU) message to the CN with the first BU/BA key, wherein the first BU message is authenticated by the CN using the first BU/BA key that is independently derived by the CN, and in response to a first binding acknowledgement (BA) message received from the CN, authenticate the first BA message using the first BU/BA key, whereby the attacker is prevented from hijacking the session without possessing the first PoK.

20. The system of claim 19, wherein the processor is further configured to:

transmit a second BU message to the CN indicating that the MN has entered the MN's home network, the second BU message including the first PoK, receive a second BA message from the CN;

authenticate the second BA message using the first PoK; and generate a second PoK by hashing the first PoK and a nonce extracted from the second BA message, wherein the second PoK is used to authenticate a subsequent BU message to be sent to the CN and to authenticate a subsequent BA message received from the CN.

21. The system of claim 20, wherein the second BU message is transmitted to the CN periodically while the MN is located within the MN's home network, wherein for each BA message received from the CN, a new PoK is generated based on a previous PoK and the nonce extracted from each BA message.

22. The system of claim 20, wherein the processor is further configured to:

in response to a signal indicating that the MN has left the MN's home network again, transmit and receive third messages as part of participating in a third return routability procedure with the HA and the CN, including generating a third Kbm;

generate a second BU/BA key by hashing the third Kbm and the second PoK;

transmit a third BU message to the CN having the second BU/BA key to allow the CN to authenticate the third BU message using the second BU/BA key that is independently derived by the CN; and in response to a third BA message received from the CN, authenticate the BA message using the third BU/BA key.

* * * * *

UNITED STATES PATENT AND TRADEMARK OFFICE
CERTIFICATE OF CORRECTION

PATENT NO. : 8,434,142 B2
APPLICATION NO. : 12/793610
DATED : April 30, 2013
INVENTOR(S) : Haddad Page 1 of 1

It is certified that error appears in the above-identified patent and that said Letters Patent is hereby corrected as shown below:

In the Drawings:

In Fig. 7, Sheet 8 of 8, for Tag "806", in Line 1, delete "Nonvolatile" and insert -- Non-volatile --, therefor.

In the Specification:

In Column 1, Line 23, delete "on path" and insert -- on-path --, therefor.

In Column 2, Line 26, delete "SUMMARY OF THE DESCRIPTION" and insert -- SUMMARY OF THE INVENTION --, therefor.

In Column 8, Line 55, delete "mice," and insert -- mouse, --, therefor.

Signed and Sealed this
Thirty-first Day of December, 2013

Margaret A. Focarino
*Commissioner for Patents of the United States Patent and Trademark Office*